United States Patent
Steele, Jr.

(10) Patent No.: US 7,069,288 B2
(45) Date of Patent: Jun. 27, 2006

(54) FLOATING POINT SYSTEM WITH IMPROVED SUPPORT OF INTERVAL ARITHMETIC

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 375 days.

(21) Appl. No.: 10/035,582

(22) Filed: Dec. 28, 2001

(65) Prior Publication Data

US 2002/0184283 A1 Dec. 5, 2002

Related U.S. Application Data

(60) Provisional application No. 60/293,173, filed on May 25, 2001.

(51) Int. Cl.
*G06F 7/48* (2006.01)

(52) U.S. Cl. ...................... 708/495; 708/497
(58) Field of Classification Search ............. 708/495, 708/497, 503–505
See application file for complete search history.

(56) References Cited

U.S. PATENT DOCUMENTS

| | | | |
|---|---|---|---|
| 3,725,649 A | 4/1973 | Deerfield | |
| 4,777,613 A | 10/1988 | Shahan et al. | |
| 4,788,655 A | 11/1988 | Nakayama et al. | |
| 4,991,131 A | 2/1991 | Yeh et al. | |
| 5,065,352 A | 11/1991 | Nakano | |
| 5,126,963 A | 6/1992 | Fukasawa | |
| 5,161,117 A | 11/1992 | Waggener, Jr. | |
| 5,249,149 A | 9/1993 | Cocanougher et al. | |
| 5,307,303 A | 4/1994 | Briggs et al. | |
| 5,347,481 A | 9/1994 | Williams .................... 364/748 |
| 5,347,482 A | 9/1994 | Williams .................... 364/757 |
| 5,357,237 A | 10/1994 | Bearden et al. | |
| 5,363,321 A | 11/1994 | Dao Trong et al. | |
| 5,365,465 A | 11/1994 | Larson | |
| 5,481,489 A | 1/1996 | Yanagida et al. | |
| 5,570,310 A | 10/1996 | Smith | |
| 5,666,301 A | 9/1997 | Makino | |
| 5,748,516 A | 5/1998 | Goddard et al. | |
| 5,812,439 A | 9/1998 | Hansen | |
| 5,862,066 A | 1/1999 | Rossin et al. | |
| 5,892,697 A | 4/1999 | Brakefield | |

(Continued)

OTHER PUBLICATIONS

U.S. Appl. No. 10/320,547, filed Dec. 17, 2002, Steele, Jr.

(Continued)

*Primary Examiner*—D. H. Malzahn
(74) *Attorney, Agent, or Firm*—Finnegan, Henderson, Farabow, Garrett & Dunner, L.L.P.

(57) ABSTRACT

Embodiments consistent with the principles of the present invention provide improved results, compared to IEEE Std. 754, for floating point operations used in interval arithmetic calculations. One embodiment consistent with the principles of the present invention provides a method of enhancing support of an interval computation when performing a floating point arithmetic operation, comprising the steps, performed by a processor, of receiving a first floating point operand, receiving a second floating point operand, executing the floating point arithmetic operation on the first floating point operand and the second floating point operand, determining whether a NaN substitution is necessary, producing a floating point result if the NaN substitution is determined to be unnecessary, and substituting an alternative value as the floating point result if the NaN substitution is determined to be necessary.

28 Claims, 5 Drawing Sheets

U.S. PATENT DOCUMENTS

| | | | |
|---|---|---|---|
| 5,931,943 | A | 8/1999 | Orup |
| 5,953,241 | A | 9/1999 | Hansen et al. |
| 5,963,461 | A | 10/1999 | Gorshtein et al. |
| 5,978,901 | A | 11/1999 | Luedtke et al. |
| 5,995,991 | A | 11/1999 | Huang et al. |
| 6,009,511 | A | 12/1999 | Lynch et al. ............... 712/222 |
| 6,049,865 | A | 4/2000 | Smith |
| 6,081,823 | A | 6/2000 | Purcell et al. |
| 6,105,047 | A | 8/2000 | Sharangpani et al. |
| 6,108,772 | A | 8/2000 | Sharangpani |
| 6,131,106 | A | 10/2000 | Steele, Jr. ................... 708/510 |
| 6,138,135 | A | 10/2000 | Karp |
| 6,151,669 | A | 11/2000 | Huck et al. |
| 6,189,094 | B1 * | 2/2001 | Hinds et al. ................ 712/222 |
| 6,205,460 | B1 | 3/2001 | Steele, Jr. |
| 6,219,685 | B1 | 4/2001 | Story |
| 6,256,655 | B1 | 7/2001 | Ezer et al. |
| 6,286,023 | B1 | 9/2001 | Purcell et al. |
| 6,286,024 | B1 | 9/2001 | Yano et al. |
| 6,360,189 | B1 | 3/2002 | Hinds et al. |
| 6,393,555 | B1 | 5/2002 | Meier et al. |
| 6,490,607 | B1 | 12/2002 | Oberman |
| 6,571,264 | B1 | 5/2003 | Lee |
| 6,594,681 | B1 | 7/2003 | Prabhu |
| 6,629,120 | B1 * | 9/2003 | Walster et al. ............. 708/620 |
| 6,658,443 | B1 * | 12/2003 | Walster ...................... 708/495 |
| 6,658,444 | B1 * | 12/2003 | Walster et al. ............. 708/504 |
| 6,697,832 | B1 | 2/2004 | Kelley et al. |
| 6,732,134 | B1 | 5/2004 | Rosenberg et al. |
| 6,789,098 | B1 | 9/2004 | Dijkstra |
| 2002/0194232 | A1 * | 12/2002 | Walster ...................... 708/207 |
| 2003/0033335 | A1 * | 2/2003 | Walster ...................... 708/207 |

OTHER PUBLICATIONS

U.S. Appl. No. 10/320,450, filed Dec. 17, 2002, Steele, Jr.
U.S. Appl. No. 10/028,375, filed Dec. 28, 2001, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
Title: "Safe Treatment of Overflow and Underflow Conditions", by Robert A. Fraley & J. Stephen Walther, Hewlett-Packard Co., pp. 1-5.
Title: "Vax Floating Point: A Solid Foundation for Numerical Computation", by Mary Payne & Dileep Bhandarkar, Digital Equipment Corp., pp. 1-12.
Title: Lecture Notes on the Status of "IEEE Standard 754 for Binary Floating-Point Arithmetic", by Prof. W. Kahan, May 31, 1996, pp. 1-30.
Title: "Interval Arithmetic Specification" by Dmitri Chiriaev & G. William Walsler, Draft revised May 4, 1998, pp. 1-78.
Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.
Office Action mailed May 5, 2005 in U.S. Appl. No. 10/035,674.

* cited by examiner

| Value | s | e... | f... |
|---|---|---|---|
| $+\infty$ | 0 | 1 1 1... | 0 0 0... |
| $-\infty$ | 1 | 1 1 1... | 0 0 0... |
| NaN | X | 1 1 1... | Not(0 0 0...) |
| +0 | 0 | 0 0 0... | 0 0 0... |
| -0 | 1 | 0 0 0... | 0 0 0... |
| $(-1)^s 2^{e-bias}(1.|f...)$ | X | Not(0 0 0...) and Not(1 1 1...) | X |
| $(-1)^s 2^{e-bias+1}(0.|f...)$ | X | 0 0 0... | Not(0 0 0...) |

110, 120, 130, 140, 150, 160, 170

X = Don't Care

FIG. 1 (Prior Art)

| | OPERATION | FIRST OPERAND | SECOND OPERAND | IEEE Result | Improved Result |
|---|---|---|---|---|---|
| 205 | FP ADDITION w/ Round toward + ∞ | - ∞<br>+ ∞ | + ∞<br>- ∞ | NaN<br>NaN | + ∞<br>+ ∞ |
| 206 | FP ADDITION w/ Round toward - ∞ | - ∞<br>+ ∞ | + ∞<br>- ∞ | NaN<br>NaN | - ∞<br>- ∞ |
| 207 | FP SUBTRACTION w/ Round toward + ∞ | + ∞<br>- ∞ | + ∞<br>- ∞ | NaN<br>NaN | + ∞<br>+ ∞ |
| 208 | FP SUBTRACTION w/ Round toward - ∞ | + ∞<br>- ∞ | + ∞<br>- ∞ | NaN<br>NaN | - ∞<br>- ∞ |
| 210 | FP MULT w/ Round toward + ∞ | + ∞<br>- ∞ | - 0<br>+ 0 | NaN<br>NaN | - 0<br>- 0 |
| 215 | FP MULT w/ Round toward - ∞ | + ∞<br>- ∞ | - 0<br>+ 0 | NaN<br>NaN | + 0<br>+ 0 |
| 220 | FP DIV w/Round toward + ∞ | - ∞<br>+ ∞<br>+ 0<br>- 0<br>- ∞<br>+ ∞<br>- 0<br>+ 0 | + ∞<br>- ∞<br>- 0<br>+ 0<br>- ∞<br>+ ∞<br>- 0<br>+ 0 | NaN<br>NaN<br>NaN<br>NaN<br>NaN<br>NaN<br>NaN<br>NaN | - 0<br>- 0<br>- 0<br>- 0<br>+ ∞<br>+ ∞<br>+ ∞<br>+ ∞ |
| 225 | FP DIV w/Round toward - ∞ | + ∞<br>- ∞<br>- 0<br>+ 0<br>+ ∞<br>- ∞<br>+ 0<br>- 0 | - ∞<br>+ ∞<br>+ 0<br>- 0<br>+ ∞<br>- ∞<br>+ 0<br>- 0 | NaN<br>NaN<br>NaN<br>NaN<br>NaN<br>NaN<br>NaN<br>NaN | - ∞<br>- ∞<br>- ∞<br>- ∞<br>+ 0<br>+ 0<br>+ 0<br>+ 0 |

FIG. 2

FLOATING POINT SYSTEM WITH IMPROVED SUPPORT OF INTERVAL ARITHMETIC

INCORPORATION BY REFERENCE

Applicant claims the right of priority based on U.S. Provisional Patent Application No. 60/293,173 filed May 25, 2001 in the name of Guy L. Steele, Jr.

Related U.S. patent application Ser. No. 10/035,747, filed on even date herewith in the name of Guy L. Steele, Jr. and entitled "Floating Point System That Represents Status Flag Information Within A Floating Point Operand," assigned to the assignee of the present application, is hereby incorporated by reference.

Related U.S. patent application Ser. No. 10/035,595, filed on even date herewith in the name of Guy L. Steele, Jr. and entitled "Floating Point Adder with Embedded Status Information," assigned to the assignee of the present application, is also hereby incorporated by reference.

Related U.S. patent application Ser. No. 10/035,580, filed on even date herewith in the name of Guy L. Steele, Jr. and entitled "Floating Point Multiplier with Embedded Status Information," assigned to the assignee of the present application, is also hereby incorporated by reference.

Related U.S. patent application Ser. No. 10/035,647, filed on even date herewith in the name of Guy L. Steele, Jr. and entitled "Floating Point Divider with Embedded Status Information," assigned to the assignee of the present application, is also hereby incorporated by reference.

FIELD OF THE INVENTION

The invention relates generally to systems and methods for performing floating point operations, and more particularly to systems, methods, and instructions for performing arithmetic operations on floating point operands while enhancing support for interval arithmetic.

BACKGROUND OF THE INVENTION

Floating Point Arithmetic

Digital electronic devices, such as digital computers, calculators, and other devices, perform arithmetic calculations on values in integer, or "fixed point," format, in fractional, or "floating point" format, or both. IEEE Standard 754, (hereinafter "IEEE Std. 754" or "the Standard") published in 1985 by the Institute of Electrical and Electronic Engineers, and adopted by the American National Standards Institute (ANSI), defines several standard formats for expressing values in floating point format, and a number of aspects regarding the behavior of computations in connection therewith. In accordance with IEEE Std. 754, a representation in floating point format comprises a plurality of binary digits, or "bits," having the structure $$se_{msb} \ldots e_{lsb} f_{msb} \ldots f_{lsb}$$

where bit "s" is a sign bit indicating whether the entire value is positive or negative, bits "$e_{msb} \ldots e_{lsb}$" comprise an exponent field representing the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats, namely, a "single" format which comprises thirty-two bits, and a "double" format which comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats, which are generally based on the bit patterns of the bits $e_{msb} \ldots e_{lsb}$ comprising the exponent field and the bits $f_{msb} \ldots f_{lsb}$ comprising the fraction field. As shown in prior art FIG. 1, if a number is represented such that all of the bits $e_{msb} \ldots e_{lsb}$ of the exponent field are binary ones (that is, if the bits represent a binary-encoded value of "255" in the single format or "2047" in the double format) and all of the bits $f_{msb} \ldots f_{lsb}$ of the fraction field are binary zeros, then the value of the number is positive infinity 110 or negative infinity 120, depending on the value of the sign bit "s." In particular, the value "v" is $v=(-1)^s \infty$ where "$\infty$" represents the value "infinity." On the other hand, if the bit pattern is formatted such that all of the bits $e_{msb} \ldots e_{lsb}$ of the exponent field are binary ones and the bits $f_{msb} \ldots f_{lsb}$ of the fraction field are not all zeros, then the value that is represented is deemed "not a number," abbreviated in the Standard by "NaN" 130.

If a number has an exponent field in which the bits $e_{msb} \ldots e_{lsb}$ are neither all binary ones nor all binary zeros (that is, if the bits represent a binary-encoded value between 1 and 254 in the single format or between 1 and 2046 in the double format), the number is said to be in a "normalized" format 160. For a number in the normalized format, the value represented by the number is $v=(-1)^s 2^{e-bias}(1.1f_{msb} \ldots f_{lsb})$, where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits $e_{msb} \ldots e_{lsb}$ are all binary zeros, representing the binary-encoded value of "zero," and a fraction field in which the bits $f_{msb} \ldots f_{lsb}$ are not all zero, the number is said to be in a "denormalized" format 170. For a number in the denormalized format, the value represented by the number is $v=(-1)^s 2^{e-bias+1}(0.1f_{msb} \ldots f_{lsb})$. It will be appreciated that the range of values of that can be expressed in the denormalized format is disjoint from the range of values of numbers that can be expressed in the normalized format, for both the single and double formats. Finally, if a number has an exponent field in which the bits $e_{msb} \ldots e_{lsb}$ are all binary zeros, representing the binary-encoded value of "zero," and a fraction field in which the bits $f_{msb} \ldots f_{lsb}$ are all zero, the number has the value "zero." It will be appreciated that the value "zero" may be positive zero 140 or negative zero 150, depending on the value of the sign bit.

Generally, floating point units to perform computations whose results conform to IEEE Std. 754 are designed to generate a result in response to a floating point instruction in three steps:

(a) First, an approximation calculation step in which an approximation to the absolutely accurate mathematical result (assuming that the input operands represent the specific mathematical values as described by IEEE Std. 754) is calculated that is sufficiently precise as to allow this accurate mathematical result to be summarized by a sign bit, an exponent (typically represented using more bits than are used for an exponent in the standard floating-point format), and some number "N" of bits of the presumed result fraction, plus a guard bit and a sticky bit. The value of the exponent will be such that the value of the fraction generated in step (a) consists of a 1 before the binary point and a fraction after the binary point. The bits are calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 . . . and 1.011111 . . . as representations of the value "one-and-one-half"); then let the N most significant bits of the infinite significand be used as the intermediate result significand, let the next bit of the infinite significand be the guard bit, and let the sticky bit be 0 if and only if ALL remaining bits of the infinite significand are 0-bits (in other words, the sticky bit is the logical OR of all remaining bits of the infinite fraction after the guard bit).

(b) Second, a rounding step, in which the guard bit, the sticky bit, perhaps the sign bit, and perhaps some of the bits of the presumed significand generated in step (a) are used to decide whether to alter the result of step (a). For the rounding modes defined by IEEE Std. 754, this is a decision as to whether to increase the magnitude of the number represented by the presumed exponent and fraction generated in step (a). Increasing the magnitude of the number is done by adding 1 to the significand in its least significant bit position, as if the significand were a binary integer. It will be appreciated that, if the significand is all 1-bits, then magnitude of the number is "increased" by changing it to a high-order 1-bit followed by all 0-bits and adding 1 to the exponent. It will be further appreciated that, (i) if the result is a positive number, and
  (a) if the decision is made to increase, effectively the decision has been made to increase the value of the result, thereby rounding the result up, towards positive infinity, but
  (b) if the decision is made not to increase, effectively the decision has been made to decrease the value of the result, thereby rounding the result down, towards negative infinity; and
(ii) if the result is a negative number, and
  (a) if the decision is made to increase, effectively the decision has been made to decrease the value of the result, thereby rounding the result down, towards negative infinity, but
  (b) if the decision is made not to increase, effectively the decision has been made to increase the value of the result, thereby rounding the result up, towards positive infinity.

(c) Finally, a packaging step, in which the result is packaged into a standard floating-point format. This may involve substituting a special representation, such as the representation format defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, we assume that this is the step that forces the result to be a NaN if any input operand is a NaN. In this step, the decision is also made as to whether the result should be an infinity. It will be appreciated that, if the result is to be a NaN or infinity, any result from step (b) will be discarded and instead the appropriate representation in the appropriate format will be provided as the result.

In addition in the packaging step, floating-point status information is generated, which is stored in a floating point status register. The floating point status information generated for a particular floating point operation includes indications, for example, as to whether:

(i) a particular operand is invalid for the operation to be performed ("invalid operation");
(ii) if the operation to be performed is division, the divisor is zero ("division-by-zero");
(iii) an overflow occurred during the operation ("overflow");
(iv) an underflow occurred during the operation ("underflow"); and
(v) the rounded result of the operation is not exact ("inexact").

These conditions are typically represented by flags that are stored in the floating point status register, separate from the floating point operand. The floating point status information can be used to dynamically control the operations performed in response to certain instructions, such as conditional branch, conditional move, and conditional trap instructions that may be in the instruction stream subsequent to the floating point instruction. Also, the floating point status information may enable processing of a trap sequence, which will interrupt the normal flow of program execution. In addition, the floating point status information may be used to affect certain ones of the functional unit control signals that control the rounding mode. IEEE Std. 754 also provides for accumulating floating point status information from, for example, results generated for a series or plurality of floating point operations.

IEEE Std. 754 has brought relative harmony and stability to floating-point computation and architectural design of floating-point units. Moreover, its design was based on some important principles and rests on sensible mathematical semantics that ease the job of programmers and numerical analysts. It also provides some support for the implementation of interval arithmetic, which may prove to be preferable to simple scalar arithmetic for many tasks. Nevertheless, IEEE Std. 754 has some serious drawbacks, including:

(i) Modes, which include the rounding mode and may also include a traps enabled/disabled mode, flags representing the floating point status information that is stored in the floating point status register, and traps that are required to implement IEEE Std. 754, all introduce implicit serialization between floating-point instructions, and between floating point instructions and the instructions that read and write the flags and modes. Implicit serialization occurs when programmers and designers try to avoid the problems caused if every floating point instructions uses, and can change, the same floating point status register. This can create problems if, for example, two instructions are executing in parallel in a microprocessor architectures featuring several CPUs running at once and both instructions cause an update of the floating point status register. In such a case, the contents of the status register would likely be incorrect with respect to at least one of the instructions, because the other parallel instruction will have written over the original contents. Similar problems can occur in scalar processor architectures, in which several instructions are issued and processed at once. To solve this problem, programmers and designers serialize floating point instructions that can affect the floating point status register, making sure they execute in a serial fashion, one instruction completing before another begins. Rounding modes can introduce implicit serialization because they are typically indicated as global state, although in some microprocessor architectures, the rounding mode is encoded as part of the instruction operation code, which will alleviate this problem to that extent. This implicit serialization makes the Standard difficult to implement coherently in today's superscalar and parallel microprocessor architectures without loss of performance.

(ii) The implicit side effects of a procedure that can change the flags or modes can make it very difficult for compilers to perform optimizations on floating-point code; to be safe, compilers for most languages must assume that every procedure call is an optimization barrier.

(iii) Global flags, such as those that signal certain modes, make it more difficult to do instruction scheduling where the best performance is provided by interleaving instructions of unrelated computations. Instructions from regions of code governed by different flag settings or different flag detection requirements cannot easily be interleaved when they must share a single set of global flag bits in a global floating point status register.

(iv) Traps have been difficult to integrate efficiently into architectures and programming language designs for fine-grained control of algorithmic behavior.

U.S. patent application Ser. No. 10/035,584, filed on even date herewith in the name of Guy L. Steele Jr. and entitled "Floating Point Unit In Which Floating Point Status Information Is Encoded In Floating Point Representations," describes a floating point unit in which floating point status information is encoded in the representations of the results generated thereby. By encoding the floating point status information relating to a floating point operation in the result that is generated for the operation, the implicit serialization required by maintaining the floating point status information separate and apart therefrom can be obviated. The floating point unit includes a plurality of functional units, including an adder unit, a multiplier unit, a divider unit, a square root unit, a maximum/minimum unit, a comparator unit and a tester unit, all of which operate under control of functional unit control signals provided by a control unit. It may also include features consistent with the principles of the present invention to provide better support for interval arithmetic.

Interval Arithmetic

Interval arithmetic can be used when processing floating point operands to compute an interval result. In general, an interval is the set of all real numbers between and including the lower and upper bound of the interval. Interval arithmetic is used to evaluate arithmetic expressions over sets of numbers contained in intervals. An interval arithmetic result is a new interval that contains the set of all possible resulting values.

In interval arithmetic computations, each computed value is represented as a pair of numbers [a, b] (where a<=b) that indicates a lower bound and an upper bound of an interval on the real number line. One can regard an interval [a, b] as a set:

$\{p | a <= p <= b\}$

It is also convenient to use "−Infinity" and "+Infinity" as bounds. For example, [3, +Infinity] represents the set of all numbers not less than 3.

Those skilled in the art will recognize that the most general definition of a binary operation f on two intervals x and y in terms of an underlying binary operation (also called f) on real numbers is:

$[glb\ S, lub\ S]$ where $S=\{f(p,q) | p\ in\ x\ and\ q\ in\ y\}$

That is, one considers all possible pairs of real arguments where each argument ranges over an input interval and computes f on all these possible pairs; the result is a set S of real results. The set S may fail to be contiguous, so to produce an interval result it is necessary to "fill it in." The greatest lower bound (glb) of S and the least upper bound (lub) of S may be used as endpoints of the result interval.

For particular "well-behaved" binary operations, it is not necessary to consider an infinite set of computations to compute the endpoints of the result interval. In particular, intervals can be added, subtracted, multiplied, and divided using the formulae:

$$[a, b] + [c, d] = [a + c, b + d]$$

$$[a, b] - [c, d] = [a - d, b - c]$$

$$[a, b] * [c, d] = [\min(a*c, a*d, b*c, b*d),$$

$$\max(a*c, a*d, b*c, b*d)]$$

$$[a, b] / [c, d] = [\min(a/c, a/d, b/c, b/d),$$

$$\max(a/c, a/d, b/c, b/d)]$$

$$\text{provided } c > 0 \text{ or } d < 0$$

If the numbers are represented in a floating-point representation with finite precision, then addition and multiplication of such numbers produce only approximate results. However, by controlling the rounding of such results, floating-point arithmetic can be correctly used for interval computations. The typical consequence of the floating-point approximations is only that result intervals may be slightly larger than mathematically necessary.

Standard IEEE 754 supports an implementation of interval arithmetic by providing rounding modes such as "round toward plus infinity" and "round toward minus infinity."

For purposes of the following discussion, let "+UP" denote floating-point addition using rounding mode "round toward plus infinity." Let "−UP" denote floating-point subtraction using rounding mode "round toward plus infinity." Let "*UP" denote floating-point multiplication using rounding mode "round toward plus infinity." Let "/UP" denote floating-point division using rounding mode "round toward plus infinity." Let "+DOWN" denote floating-point addition using rounding mode "round toward minus infinity." Let "−DOWN" denote floating-point subtraction using rounding mode "round toward minus infinity." Let "*DOWN" denote floating-point multiplication using rounding mode "round toward minus infinity." Finally, let "/DOWN" denote floating-point division using rounding mode "round toward minus infinity."

Under these naming conventions, the interval computation rules using floating-point arithmetic may be written as:

$$[a, b] + [c, d] = [a + \text{DOWN } c, b + \text{UP } d]$$

$$[a, b] - [c, d] = [a - \text{DOWN } d, b - \text{UP } c]$$

$$[a, b] * [c, d] = [\min(a * \text{DOWN } c, a * \text{DOWN } d, b * \text{DOWN } c,$$
$$b * \text{DOWN } d), \max(a * \text{UP } c, a * \text{UP } d, b * \text{UP } c,$$
$$b * \text{UP } d)]$$

$$[a, b] / [c, d] = \text{if } (c > 0 \text{ or } d < 0) \text{ then}$$
$$[\min(a / \text{DOWN } c, a / \text{DOWN } d, b / \text{DOWN } c,$$
$$b / \text{DOWN } d), \max(a / \text{UP } c, a / \text{UP } d, b / \text{UP } c,$$
$$b / \text{UP } d)]$$
$$\text{else } [-\text{Infinity}, +\text{Infinity}].$$

Despite this interval arithmetic support, IEEE 754-1985 has some drawbacks for performing interval arithmetic operations. There are certain situations in which IEEE 754 specifies that a floating-point operation must deliver a result in the NaN format, even though the rounding mode is "round toward plus infinity" or "round toward minus infinity" and even though a reasonable result could be returned that would be useful as an interval bound. For example, consider that two intervals:

[−Inf, 6] and [+Inf, +Inf].

The sum of these two intervals may be computed as:

[−Inf+DOWN+Inf, 6+UP+Inf].

where "Inf" means "infinity" as specified by IEEE 754. It is clear that a reasonable result would be:

[−Inf, +Inf].

However, IEEE 754 specifies that, under any rounding mode, the result of (−Inf)+(+Inf) is a NaN result. Therefore, using IEEE 754 arithmetic to compute this interval sum produces:

[NaN, +Inf], which is not a properly formed interval. This may undesirably lead to confusing or invalid results for interval arithmetic operations and, potentially, to erroneous calculations.

To prevent malformed intervals such as in the previous example, programmers of IEEE 754 machines typically design special software routines to recognize inputs that create such malformed intervals and use extra code routines to handle them before doing the interval arithmetic operation. Disadvantageously, such special routines waste time and space in software programs.

Thus, there is a need for systems and methods that efficiently support addition, subtraction, multiplication, and division of intervals using floating-point arithmetic similar to that of IEEE 754, but such that the result of every interval operation is a well-formed interval.

SUMMARY OF THE INVENTION

Systems and methods according to the principles of the present invention apply to IEEE 754 format machines and systems, as well as machines and systems that have floating point status information encoded in their operands and results, as described in the related applications.

Embodiments consistent with the principles of the present invention provide improved results, compared to IEEE Std. 754, for floating point operations used in interval arithmetic calculations. One embodiment consistent with the principles of the present invention provides a method of enhancing support of an interval computation when performing a floating point arithmetic operation, comprising the steps, performed by a processor, of receiving a first floating point operand, receiving a second floating point operand, executing the floating point arithmetic operation on the first floating point operand and the second floating point operand, determining whether a NaN substitution is necessary, producing a floating point result if the NaN substitution is determined to be unnecessary, and substituting an alternative value as the floating point result if the NaN substitution is determined to be necessary.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 1 depicts prior art formats for representation of floating point values;

FIG. 2 is a table showing the IEEE Standard 754 results compared to exemplary improved interval arithmetic results consistent with the principles of the present invention, for various floating point arithmetic operations;

Figure 3:
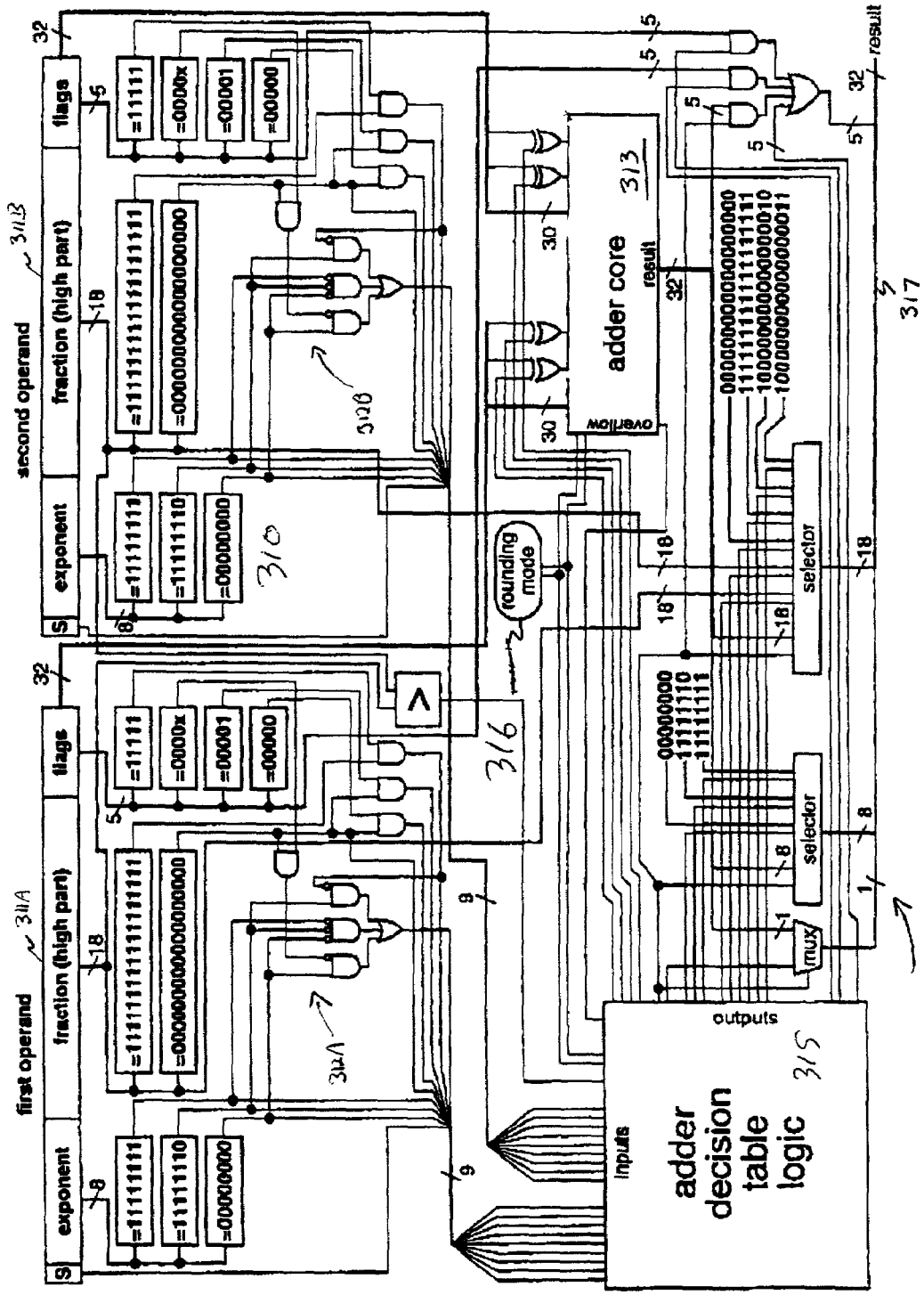
FIG. 3 is a functional block diagram of an exemplary adder/subtracter unit according to one embodiment of the invention.

DETAILED DESCRIPTION OF AN
ILLUSTRATIVE EMBODIMENT

The following description of embodiments consistent with the principles of the present invention assumes 32-bit floating-point numbers. However, adapting it to 64 bits or to other sizes is straightforward and obvious to one who is of ordinary skill in the art. The embodiments described contemplate using general purpose computer instructions to implement the invention, but one of ordinary skill will recognize that specialized interval arithmetic computer instructions, or other designs, could also easily be used to implement the invention.

Systems and methods consistent with the principles of the present invention provide support for floating-point arithmetic in the manner of IEEE 754 and in the manner described in related, incorporated-by-reference U.S. patent application Ser. No. 10/035,747, filed on even date herewith in the name of Guy L. Steele, Jr. entitled "Floating Point System That Represents Status Flag Information Within A Floating Point Operand," assigned to the assignee of the present application. Embodiments consistent with the principles of the present invention define results for arithmetic operations with the rounding modes "round toward plus infinity" and "round toward minus infinity" such that a "NaN" is not produced as a result if none of the inputs is a NaN. Eliminating NaN as a result improves interval arithmetic calculations because valid intervals are produced instead of malformed intervals with NaN as an endpoint. Further, substituting a non-NaN result for the conventional NaN result allows for efficient processing because execution time and code space are not wasted on special routines otherwise used to handle a conventional NaN result. Systems and methods consistent with the principles of the present invention may comprise software to be used for performing addition, subtraction, multiplication, and division of intervals on a computer system. Software that supports the improved definition of floating-point addition, subtraction, multiplication, and division, performs interval computations that produce more precise and reliable results than computations performed by existing systems.

One embodiment consistent with the principles of the invention supports floating-point arithmetic as defined by related U.S. patent application Ser. No. 10/035,747, filed on even date herewith in the name of Guy L. Steele, Jr. entitled "Floating Point System That Represents Status Flag Information Within A Floating Point Operand," assigned to the assignee of the present application. In this embodiment, the floating point operands have status information encoded within the operand itself. Additionally, the floating point arithmetic includes computations involving positive and negative overflow and underflow values (+OV, −OV, +UN, and −UN). Another embodiment consistent with the principles of the invention supports IEEE 754-compliant arithmetic, except for the changes in the handling of zero and infinity operands as described herein.

Related U.S. patent application Ser. No. 10/035,595, filed on even date herewith in the name of Guy L. Steele, Jr. and entitled "Floating Point Adder with Embedded Status Information," assigned to the assignee of the present application, describes improved add and subtract instructions. In brief summary, subtraction is defined to behave as (a−b)=(a+(−b)), where unary "−" simply flips the sign bit of its operand. As shown in FIG. 2, an embodiment consistent with the principles of the present invention improves addition operations 205 and subtraction operations 207 by providing that for "round toward plus infinity" the result of adding infinities of opposite signs is +Infinity, substituted for NaN as specified by IEEE Std. 754. Similarly, for "round toward minus infinity" addition 206 and subtraction 208 operations, the result of adding infinities of opposite signs is −Infinity, instead of NaN. As a result, the standard formulae for interval addition and subtraction:

$$[a, b]+[c, d]=[a+\text{DOWN } c, b+\text{UP } d]$$

$$[a, b]-[c, d]=[a-\text{DOWN } d, b-\text{UP } c]$$

produce improved results in certain situations where IEEE 754 would produce a malformed interval (e.g., an interval with a NaN) or would necessitate the use of a more complicated formula to forestall the production of a NaN result.

Related U.S. patent application Ser. No. 10/035,580, filed on even date herewith in the name of Guy L. Steele, Jr. and entitled "Floating Point Multiplier with Embedded Status Information," assigned to the assignee of the present application, describes an improved multiplication instruction. An embodiment consistent with the principles of the present invention improves multiplication operations by providing that a multiplication with "round toward plus infinity" 210 produces −0 as the result of multiplying an infinity and a zero of opposite signs, substituting for NaN as specified by IEEE 754. Similarly, the result of multiplying an infinity and a zero of like signs is forced to +Infinity, instead of resulting in a NaN. Also, for "round toward minus infinity" multiplication 215, the result of multiplying an infinity and a zero of opposite signs is −Infinity, not NaN, and the result of multiplying an Infinity and a zero of like signs is +0, not NaN. Using such an implementation, the standard formula for interval multiplication:

$$[a, b]*[c, d]=[\min(a*\text{DOWN}c, a*\text{DOWN } d,\\ b*\text{DOWN } c, b*\text{DOWN } d), \max(a*\text{UP } c, a*\text{UP}\\ d, b*\text{UP } c, b*\text{UP } d)]$$

produces improved results in certain situations where IEEE 754 would otherwise produce a malformed interval (e.g., an interval containing a NaN) or would necessitate the use of a more complicated formula to forestall the production of a NaN result.

Related U.S. patent application Ser. No. 10/035,647, filed on even date herewith in the name of Guy L. Steele, Jr. and entitled "Floating Point Divider with Embedded Status Information," assigned to the assignee of the present application, describes an improved division instruction. An embodiment consistent with the principles of the present invention improves divide operations by providing that for "round toward plus infinity" division 220, the result of dividing two infinities or two zeros of opposite signs is −0, substituted for NaN as specified by IEEE 754. Additionally, the result of dividing two infinities or two zeros of like signs is +Infinity, instead of NaN. Similarly, for "round toward minus infinity" division 225, the result of dividing two infinities or two zeros of opposite signs is −Infinity, not NaN, and the result of dividing two infinities or two zeros of like sign is +0, substituted for NaN. Using such an improvement, the standard formula for interval division:

$$[a, b]/[c, d]=\text{if}(c>0 \text{ or } d<0) \text{ then } [\min(a/\text{DOWN } c,\\ a/\text{DOWN } d, b*\text{DOWN } c, b*\text{DOWN } d), \max(a/\\ \text{UP } c, a/\text{UP } d, b/\text{UP } c, b/\text{UP } d)] \text{else } [-\text{Infinity},\\ +\text{Infinity}]$$

produces improved results in certain situations where IEEE 754 would produce a malformed interval (e.g., an interval containing a NaN) or would necessitate the use of a more complicated formula to forestall the production of a NaN result.

FIG. 3 is a functional block diagram of an exemplary adder/subtracter unit according to one embodiment of the invention. In summary, the exemplary adder/subtracter unit 310 receives two floating point operands and generates a result, and in some cases floating point status information, based on the operands. In the embodiment shown, the floating point status information is encoded within the floating point representation of the result. Having the floating point status information comprise part of the result, instead of being separate and apart from the result, (for example in a separate floating point status register), obviates the implicit serialization of floating point instructions that would be otherwise required.

The exemplary adder/subtracter unit 310 includes two operand buffers 311A and 311B, respective operand analysis circuits 312A and 312B, an adder core 313, a result assembler 314, and an adder decision table logic circuit 315. The operand buffers 311A and 311B receive and store respective operands that may be received from, for example, a set of registers (not shown) in a conventional manner.

Generally, the adder core 313 receives the operands from the operand buffers 311A and 311B and receives rounding mode information from, for example, a rounding mode store 316. Rounding mode store 316 supplies signals indicating, for example, whether the rounding mode for the current operation is "round toward plus infinity" or "round toward minus infinity." In accordance with the principles of the present invention, one embodiment of the adder unit 310 generates results according to the table in FIG. 2, as discussed above. In one embodiment, adder core 313 produces results conforming to IEEE Standard 754; certain addition and subtraction operations always produce a NaN result regardless of the rounding mode, thus leading to production of malformed intervals if left unmodified. In the embodiment shown, however, adder decision table logic 315, which controls the result assembler 314, replaces a NaN result with a non-NaN result. In one embodiment, adder decision table logic 315 determines whether to substitute a non-NaN result for a NaN result by examining the first operand 311A and the second operand 311B before or during the operation of adder core 313, knowing that certain addition operands produce a NaN under IEEE 754. In such an embodiment, adder core 313 could be simplified to not handle cases where a NaN result would be replaced by adder decision table logic 315 (making the core IEEE 754 noncompliant), or adder core 313 could be bypassed so as not to operate at all in cases where a NaN result would be replaced. In another embodiment that is probably slower because the replacement determination is not made in parallel with the adder core's operation, adder decision table logic 315 determines whether to substitute a non-NaN result for a NaN result by examining the result produced by adder core 313. In yet another embodiment easily within the knowledge of one of ordinary skill in the art, adder core 313 produces a non-NaN result for cases where IEEE 754 compliance would otherwise call for a NaN result. In this embodiment, the core in effect self-determines and replaces an IEEE 754 NaN result with a non-NaN result, obviating the need for adder decision table logic 315 to make the determination and replacement. In such an embodiment, adder core 313 would obviously no longer be IEEE 754 compliant.

Each operand analysis circuit 312A, 312B analyzes the operand in the respective operand buffer 311A, 311B and generates signals providing information relating to the respective operands. These signals are provided to the adder decision table logic 315.

The result assembler 314 receives information from a number of sources, including the operand buffers 311A and 311B, adder core 313, and several predetermined value stores. Under control of signals from the adder decision table logic 315, result assembler 314 generates the result and provides it to a result bus 317. The result bus 317 may provide the result signals to any convenient destination, such as a register or memory unit, for storage or other use.

One of ordinary skill in the art will recognize that an improved adder core designed to produce results according to the table of FIG. 2 could be implemented in a floating point adder/subtracter unit that does not use floating point status information encoded within the floating point operands, without departing from the principles of the present invention. One of ordinary skill will also realize that the principles of the present invention are also applicable to conventional floating point adder/subtracter architectures that, for example, maintain floating point status information in a global floating point status register, separate from the operands and result. Moreover, it would also be apparent to one of ordinary skill in the art that the NaN result substitutions according to the table in FIG. 2 are not the only possible logical substitutions. Other non-NaN results could be used within the scope of the present invention.

Figure 4:
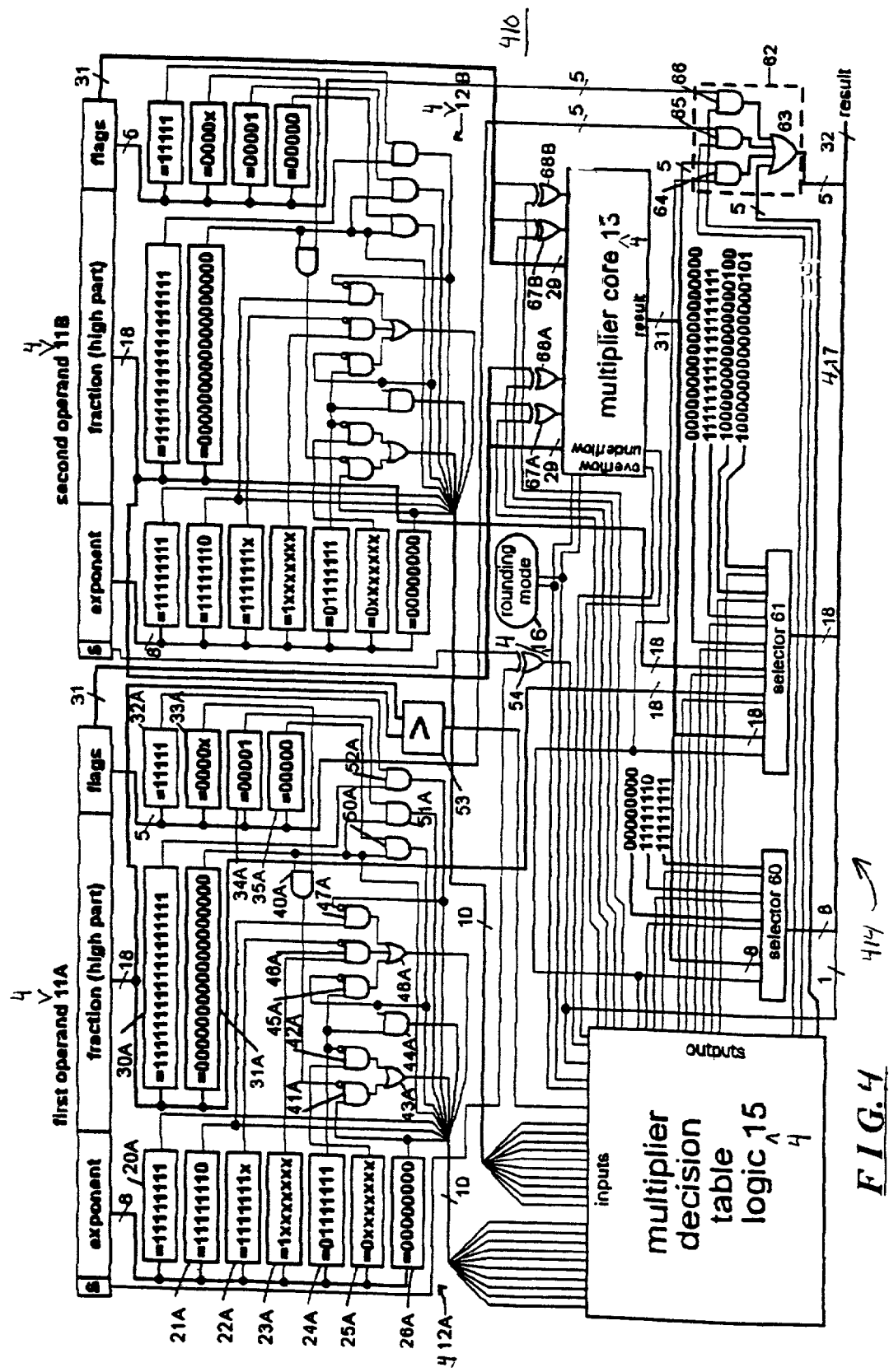
FIG. 4 is a functional block diagram of an exemplary multiplier unit according to one embodiment of the invention.

FIG. 4 is a functional block diagram of an exemplary multiplier unit according to one embodiment of the invention. Generally, the exemplary multiplier unit 410 receives two floating point operands and generates therefrom a result. In some cases, multiplier unit 410 also generates floating point status information, which is encoded in and comprises part of the floating point representation of the result. Since the floating point status information comprises part of the floating point representation of the result, instead of being separate and apart from the result as in conventional multiplier units, the implicit serialization that is required by maintaining the floating point status information separate and apart from the result can be obviated.

As shown in FIG. 4, the exemplary multiplier unit 410 includes two operand buffers 411A and 411B, respective operand analysis circuits 412A and 412B, a multiplier core 413, a result assembler 414 and an multiplier decision table logic circuit 415. The operand buffers 411A and 411B receive and store respective operands from, for example, a set of registers (not shown) or memory (not shown) in a conventional manner.

Generally, the multiplier core 413 receives the operands from the operand buffers 411A and 411B and rounding mode information from, for example, a rounding mode store 416. Rounding mode store 416 supplies signals indicating, for example, whether the rounding mode for the current operation is "round toward plus infinity" or "round toward minus infinity." In accordance with the principles of the present invention, one embodiment of the multiplier unit 410 generates results according to the table in FIG. 2, as discussed above. In one embodiment, multiplier core 413 produces results conforming to IEEE Standard 754; certain multiplication operations always produce a NaN result regardless of the rounding mode, thus leading to production of malformed intervals if left unmodified. In the embodiment shown, however, multiplier decision table logic 415, which controls the result assembler 414, replaces a NaN result with a non-NaN result. In one embodiment, multiplier decision table logic 415 determines whether to substitute a non-NaN result for a NaN result by examining the first operand 411A and the second operand 411B before or during operation of multiplier core 413, knowing that certain multiplication operands produce a NaN under IEEE 754. In such an embodiment, multiplier core 413 could be simplified to not handle cases where a NaN result would be replaced by multiplier decision table logic 415 (making the core IEEE 754 noncompliant), or multiplier core 413 could be bypassed so as not to operate at all in cases where a NaN result would be replaced. In another embodiment that is probably slower because the replacement decision is not made in parallel with the multiplier core's operation, multiplier decision table logic 415 determines whether to substitute a non-NaN result for a NaN result by examining the result produced by multiplier core 413. In yet another embodiment easily within the knowledge of one of ordinary skill in the art, multiplier core 413 produces a non-NaN result for cases where IEEE 754 compliance would otherwise call for a NaN result. In this embodiment, the core in effect self-determines and replaces an IEEE 754 NaN result with a non-NaN result, obviating the need for multiplier decision table logic 415 to make the determination and replacement. In such an embodiment, multiplier core 413 would obviously no longer be IEEE 754 compliant.

Each operand analysis circuit 412A, 412B analyzes the operand in the respective buffer 411A, 411B and generates signals providing information relating thereto, which signals are provided to the multiplier decision table logic circuit 415.

The result assembler 414 receives information from a number of sources, including the operand buffers 411A and 411B, multiplier core 413 and several predetermined value stores. Under control of signals from the multiplier decision table logic circuit 415, result assembler 414 generates the result, which is provided on a result bus 417. The result bus 417, in turn, may deliver the result to any convenient destination, such as a register in a register set (not shown), for storage or other use.

One of ordinary skill in the art will recognize that an improved multiplier core designed to produce results according to the table of FIG. 2 could be implemented in a floating point multiplier unit that does not use floating point status information encoded within the floating point operands, without departing from the principles of the present invention. One of ordinary skill will realize that the principles of the present invention are also applicable to conventional floating point multiplier architectures that, for example, maintain floating point status information in a global floating point status register, separate from the operands and result. Moreover, it would also be apparent to one of ordinary skill in the art that the NaN result substitutions according to the table in FIG. 2 are not the only possible logical substitutions. Other non-NaN results could be used within the scope of the present invention.

Figure 5:
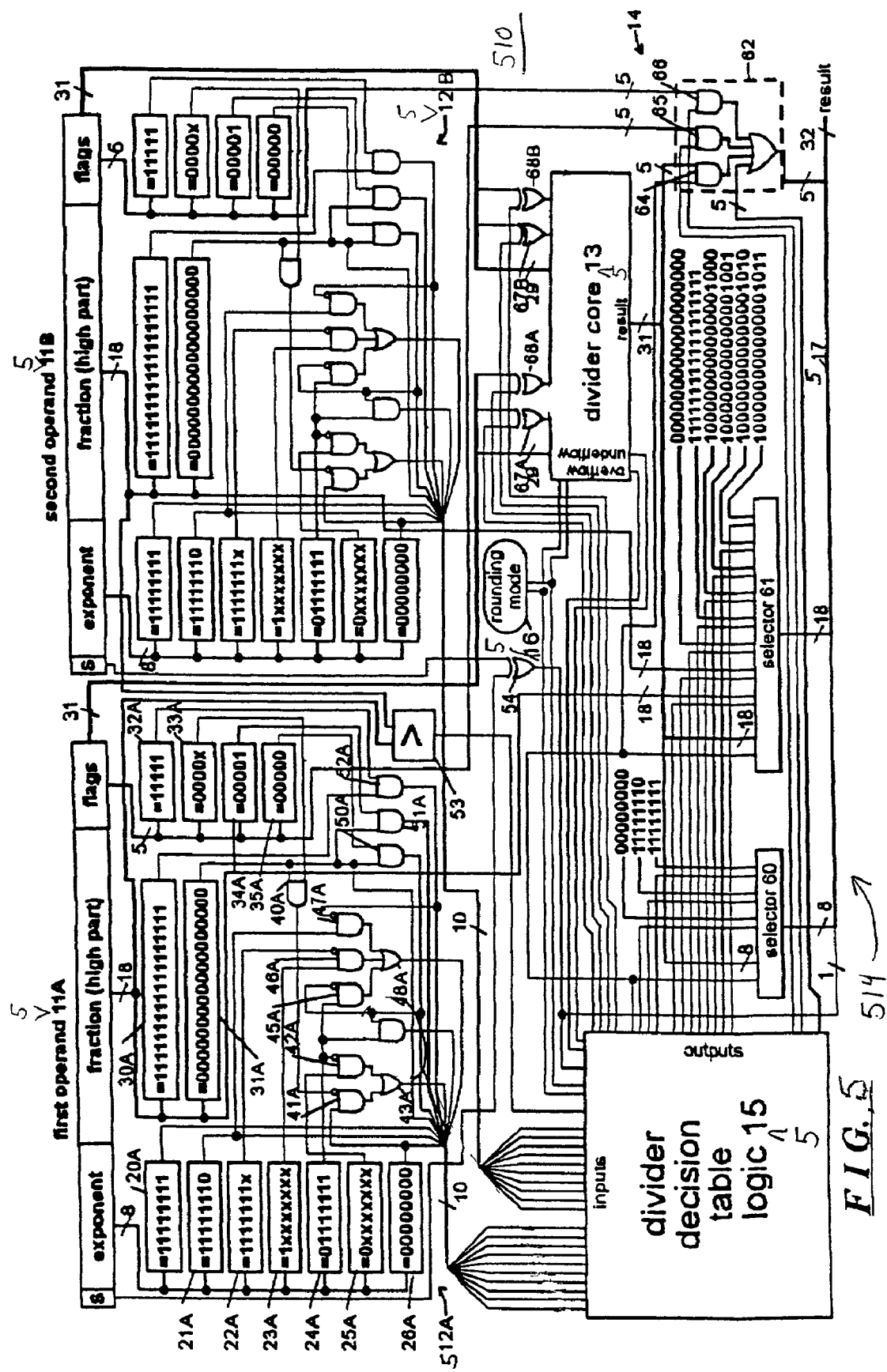
FIG. 5 is a functional block diagram of an exemplary divider unit according to one embodiment of the invention.

FIG. 5 is a functional block diagram of an exemplary divider unit according to one embodiment of the invention. Generally, the exemplary divider unit 510 receives two floating point operands and generates therefrom a result. In some cases, the exemplary divider unit 510 generates floating point status information encoded in and comprising part of the floating point representation of the result. Since the floating point status information comprises part of the floating point representation of the result, instead of being separate and apart from the result as in conventional divider units, the implicit serialization that is required by maintaining the floating point status information separate and apart from the result can be obviated.

As shown in FIG. 5, the exemplary divider unit 510 includes two operand buffers 511A and 511B, respective operand analysis circuits 512A and 512B, a divider core 513, a result assembler 514 and a divider decision table logic circuit 515. The operand buffers 511A and 511B receive and store respective operands from, for example, a set of registers (not shown) or memory (not shown) in a conventional manner.

The divider core 513 receives the operands from the operand buffers 511A and 511B, and rounding mode information from, for example, a rounding mode store 516. Rounding mode store 516 supplies signals indicating, for example, whether the rounding mode for the current operation is "round toward plus infinity" or "round toward minus infinity." In accordance with the principles of the present invention, one embodiment of the divider unit 510 generates results according to the table in FIG. 2, as discussed above. In one embodiment, divider core 513 produces results conforming to IEEE Standard 754; certain division operations always produce a NaN result regardless of the rounding mode, thus leading to production of malformed intervals if left unmodified. In the embodiment shown, however, divider decision table logic 515, which controls the result assembler 514, replaces a NaN result with a non-NaN result. In one embodiment, divider decision table logic 515 decides whether to substitute a non-NaN result for a NaN result by examining the first operand 511A and the second operand 511B before or during operation of divider core 513, knowing that certain division operands produce a NaN under IEEE 754. In such an embodiment, divider core 513 could be simplified to not handle cases where a NaN result would be replaced by divider decision table logic 515 (making the core IEEE 754 noncompliant), or divider core 513 could be bypassed so as not to operate at all in cases where a NaN result would be replaced. In another embodiment that is probably slower because the replacement decision is not made in parallel with the divider core's operation, divider decision table logic 515 decides whether to substitute a non-NaN result for a NaN result by examining the result produced by divider core 513. In yet another embodiment easily within the knowledge of one of ordinary skill in the art, divider core 513 produces a non-NaN result for cases where IEEE 754 compliance would otherwise call for a NaN result. In this embodiment, the core in effect self-determines and replaces an IEEE 754 NaN result with a non-NaN result, obviating the need for divider decision table logic 515 to make the determination and replacement. In such an embodiment, divider core 513 would obviously no longer be IEEE 754 compliant.

Each operand analysis circuit 512A, 512B analyzes the operand in the respective buffer 511A, 511B and generates signals providing information relating thereto, which signals are provided to the divider decision table logic circuit 515.

The result assembler 514 receives information from a number of sources, including the operand buffers 511A and 511B, divider core 513 and several predetermined value stores. Under control of signals from the divider decision table logic circuit 515, result assembler 514 generates the result, which is provided on a result bus 517. The result bus 517, in turn, may deliver the result to any convenient destination, such as a register in a register set (not shown), for storage or other use.

One of ordinary skill in the art will recognize that an improved divider core designed to produce results according to the table of FIG. 2 could be implemented in a floating point divider unit that does not use floating point status information encoded within the floating point operands, without departing from the principles of the present invention. One of ordinary skill will realize that the principles of the present invention are also applicable to conventional floating point multiplier architectures that, for example, maintain floating point status information in a global floating point status register, separate from the operands and result. Moreover, it would also be apparent to one of ordinary skill in the art that the NaN result substitutions according to the table in FIG. 2 are not the only possible logical substitutions. Other non-NaN results could be used within the scope of the present invention.

One of ordinary skill in the art will recognize that the results chosen to substitute for the IEEE Std. 754 NaN results in the illustrated embodiments, as well as the conditions and circuits chosen to produce the improved results, could easily be altered without departing from the principles of the present invention. For example, one of ordinary skill could easily design circuits and methods that produce a negative zero result if an infinity operand is multiplied with a zero operand having the opposite sign, with a round toward plus infinity rounding mode. Such alterations improve over the IEEE 754 result when the operation is used in interval arithmetic calculations and fall within the scope of the present invention.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

Those skilled in the art will appreciate that the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. In addition, the invention may be practiced within a general purpose computer or in any other circuits or systems as are known by those skilled in the art.

The foregoing description has been limited to specific embodiments of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. A method of enhancing support of an interval computation when performing a floating point arithmetic operation, comprising the steps, performed by a processor, of:
   receiving a first floating point operand;
   receiving a second floating point operand;
   executing the floating point arithmetic operation on the first floating point operand and the second floating point operand;
   determining whether a NaN substitution is necessary;
   producing a floating point result if the NaN substitution is determined to be unnecessary; and
   substituting an alternative value as the floating point result if the NaN substitution is determined to be necessary,
   wherein the substituting step further comprises:
   setting the floating point result to the alternative value if the floating point arithmetic operation is addition, and the first floating point operand and the second floating point operand, respectively, are from the group comprising: (1) negative infinity and positive infinity, and (2) positive infinity and negative infinity.

2. The method of claim 1, wherein the alternative value depends upon a rounding mode associated with the floating point arithmetic operation.

3. The method of claim 1, wherein the floating point arithmetic operation is one of the group comprising: addition, subtraction, multiplication, and division.

4. The method of claim 1, wherein the substituting step further comprises:
   producing floating status information reflecting the alternative value if the NaN substitution is determined to be necessary; and
   storing the floating point status information in a floating point status register, separate from the floating point result.

5. The method of claim 1, wherein the substituting step further comprises:
   producing floating status information reflecting the alternative value if the NaN substitution is determined to be necessary; and encoding the floating point status information within the floating point result.

6. The method of claim 1, wherein the alternative value is positive infinity if a rounding mode for the floating point operation is round toward positive infinity.

7. The method of claim 1, wherein the alternative value is negative infinity if a rounding mode for the floating point operation is round toward negative infinity.

8. The method of performing a floating point arithmetic operation of claim 1, wherein the processor performs the method in response to an interval arithmetic computer instruction.

9. A method of enhancing support of an interval computation when performing a floating point arithmetic operation, comprising the steps, performed by a processor, of:
   receiving a first floating point operand;
   receiving a second floating point operand;
   executing the floating point arithmetic operation on the first floating point operand and the second floating point operand;
   determining whether a NaN substitution is necessary;
   producing a floating point result if the NaN substitution is determined to be unnecessary; and
   substituting an alternative value as the floating point result if the NaN substitution is determined to be necessary,
   wherein the substituting step further comprises:
   setting the floating point result to the alternative value if the floating point arithmetic operation is subtraction, and the first floating point operand and the second floating point operand, respectively, are from the group comprising: (1) negative infinity and negative infinity; and (2) positive infinity and positive infinity.

10. The method of claim 9, wherein the alternative value is positive infinity if a rounding mode for the floating point operation is round toward positive infinity.

11. The method of claim 9, wherein the alternative value is negative infinity if a rounding mode for the floating point operation is round toward negative infinity.

12. A method of enhancing support of an interval computation when performing a floating point arithmetic operation, comprising the steps, performed by a processor, of:
   receiving a first floating point operand;
   receiving a second floating point operand;
   executing the floating point arithmetic operation on the first floating point operand and the second floating point operand;
   determining whether a NaN substitution is necessary;
   producing a floating point result if the NaN substitution is determined to be unnecessary; and
   substituting an alternative value as the floating point result if the NaN substitution is determined to be necessary,
   wherein the substituting step further comprises:
   setting the floating point result to the alternative value if the floating point arithmetic operation is multiplication, and the first floating point operand and the second floating point operand are an infinity and a zero.

13. The method of claim 12, wherein the alternative value is negative zero if a rounding mode for the floating point operation is round toward positive infinity, and the first floating point operand and the second floating point operand are an infinity and a zero of opposite sign from the infinity.

14. The method of claim 12, wherein the alternative value is positive zero if a rounding mode for the floating point operation is round toward negative infinity, and the first floating point operand and the second floating point operand are an infinity and a zero of opposite sign from the infinity.

15. A method of enhancing support of an interval computation when performing a floating point arithmetic operation, comprising the steps, performed by a processor, of:
receiving a first floating point operand;
receiving a second floating point operand;
executing the floating point arithmetic operation on the first floating point operand and the second floating point operand;
determining whether a NaN substitution is necessary;
producing a floating point result if the NaN substitution is determined to be unnecessary; and
substituting an alternative value as the floating point result if the NaN substitution is determined to be necessary, wherein the substituting step further comprises:
setting the floating point result to the alternative value if the floating point arithmetic operation is division, and the first floating point operand and the second floating point operand are a first infinity and a second infinity.

16. The method of claim 15, wherein the alternative value is negative zero if a rounding mode for the floating point operation is round toward positive infinity, and the first floating point operand and the second floating point operand are a first infinity and a second infinity of opposite sign from the first infinity.

17. The method of claim 15, wherein the alternative result is positive infinity if a rounding mode for the floating point operation is round toward positive infinity, and the first floating point operand and the second floating point operand are a first infinity and a second infinity of the same sign as the first infinity.

18. The method of claim 15, wherein the alternative value is negative infinity if a rounding mode for the floating point operation is round toward negative infinity, and the first floating point operand and the second floating point operand are a first infinity and a second infinity of opposite sign from the first infinity.

19. The method of claim 15, wherein the alternative value is positive zero if a rounding mode for the floating point operation is round toward negative infinity, and the first floating point operand and the second floating point operand are a first infinity and a second infinity of the same sign as the first infinity.

20. A method of enhancing support of an interval computation when performing a floating point arithmetic operation, comprising the steps, performed by a processor, of:
receiving a first floating point operand;
receiving a second floating point operand;
executing the floating point arithmetic operation on the first floating point operand and the second floating point operand;
determining whether a NaN substitution is necessary;
producing a floating point result if the NaN substitution is determined to be unnecessary; and
substituting an alternative value as the floating point result if the NaN substitution is determined to be necessary, wherein the substituting step further comprises:
setting the floating point result to the alternative value if the floating point arithmetic operation is division, and the first floating point operand and the second floating point operand are a first zero and a second zero.

21. The method of claim 20, wherein the alternative value is negative zero if a rounding mode for the floating point operation is round toward positive infinity, and the first floating point operand and the second floating point operand are a first zero and a second zero of opposite sign from the first zero.

22. The method of claim 20, wherein the alternative value is positive infinity if a rounding mode for the floating point operation is round toward positive infinity, and the first floating point operand and the second floating point operand are a first zero and a second zero of the same sign as the first zero.

23. The method of claim 20, wherein the alternative value is positive zero if a rounding mode for the floating point operation is round toward negative infinity, and the first floating point operand and the second floating point operand are a first zero and a second zero of the same sign as the first zero.

24. The method of claim 20, wherein the alternative value is negative infinity if the rounding mode for the floating point operation is round toward negative infinity, and the first floating point operand and the second floating point operand are a first zero and a second zero of the opposite sign as the first zero.

25. A floating point adder circuit that provides enhanced support of an interval computation when performing a floating point arithmetic operation comprising;
an adder core circuit, connected to a first operand buffer, a second operand buffer, and a rounding mode means, for adding a first floating point operand and a second floating point operand and generating a floating point result; and
substituting means for determining whether the standards-compliant floating point result is a NaN and substituting an alternative value as the floating point result if the standards-compliant floating point result is determined to be a NaN.

26. The floating point adder circuit of claim 25, wherein the substituting means are integral to the adder core circuit.

27. The floating point adder circuit of claim 25, wherein the substituting means are logic gates external to an IEEE-754-standards-compliant adder core circuit.

28. The floating point adder circuit of claim 25, wherein the alternative value depends upon a rounding mode determined by the rounding mode means.

* * * * *